(12) United States Patent
Backes

(10) Patent No.: US 12,465,014 B2
(45) Date of Patent: Nov. 11, 2025

(54) RAMP FOR PETS TO TRAVERSE OBSTACLES

(71) Applicant: Love Wink Products LLC, Guilford, CT (US)

(72) Inventor: Larry Paul Backes, Guilford, CT (US)

(73) Assignee: Love Wink Products LLC, Guilford, CT (US)

( * ) Notice: Subject to any disclaimer, the term of this patent is extended or adjusted under 35 U.S.C. 154(b) by 0 days.

(21) Appl. No.: 17/944,989

(22) Filed: Sep. 14, 2022

(65) Prior Publication Data

US 2023/0083201 A1 Mar. 16, 2023

Related U.S. Application Data

(60) Provisional application No. 63/244,046, filed on Sep. 14, 2021.

(51) Int. Cl.
*A01K 1/035* (2006.01)
*B65G 69/28* (2006.01)

(52) U.S. Cl.
CPC ............ *A01K 1/035* (2013.01); *B65G 69/287* (2013.01)

(58) Field of Classification Search
CPC ........ A01K 1/035; B65G 69/30; B65G 69/28; B60P 1/43; B60P 1/431; B60P 1/433; B60P 1/435; B60P 1/436; B60P 1/438; A61G 3/061; A61G 3/02; A61G 3/06; A61G 5/10
USPC ................... 119/487, 849; 414/537
See application file for complete search history.

(56) References Cited

U.S. PATENT DOCUMENTS

| | | | | |
|---|---|---|---|---|
| 127,961 A * | 6/1872 | Cottle | ............... | A01K 1/035 119/847 |
| 449,228 A * | 3/1891 | Myers | ............... | A01K 1/035 119/849 |
| 488,217 A * | 12/1892 | Orr | ............... | E01F 13/02 256/48 |
| 788,424 A * | 4/1905 | Ochs | ............... | A01K 1/035 14/69.5 |
| 814,096 A * | 3/1906 | Swan | ............... | A01K 1/035 119/849 |
| 963,918 A * | 7/1910 | Miller | ............... | B65G 69/30 193/41 |
| 1,512,756 A * | 10/1924 | Gharst | ............... | B61D 47/00 119/849 |
| 1,733,517 A * | 10/1929 | Siddens | ............... | E04F 11/00 193/31 R |
| 2,822,940 A * | 2/1958 | Kopaska | ............... | B60P 1/431 414/537 |
| 5,601,278 A * | 2/1997 | Graber | ............... | E04H 17/143 256/66 |
| 7,493,874 B2 | 2/2009 | Simpson et al. | | |

(Continued)

FOREIGN PATENT DOCUMENTS

KR 200490028 Y1 * 9/2019

*Primary Examiner* — Zoe Tam Tran
(74) *Attorney, Agent, or Firm* — Weber Rosselli & Cannon LLP

(57) ABSTRACT

The present disclosure describes a unique pet ramp, which allows aging or infirmed pets, of various sizes to traverse an obstacle in a safe and controlled manner. The pet ramp includes a ramp base assembly and one or more rail assemblies. A support assembly may also be provided. The base assembly including a plurality of base cleats.

20 Claims, 11 Drawing Sheets

(56) References Cited

U.S. PATENT DOCUMENTS

| | | | |
|---|---|---|---|
| 8,448,278 B1* | 5/2013 | Beilstein | B65G 69/30 |
| | | | 414/537 |
| 8,899,188 B1 | 12/2014 | Douglas et al. | |
| 9,775,326 B1 | 10/2017 | MacNeil et al. | |
| 10,104,864 B2 | 10/2018 | Murray | |
| 10,676,938 B2* | 6/2020 | Winter | E04F 15/02183 |
| 2011/0192096 A1* | 8/2011 | Koberinski | E04B 5/43 |
| | | | 52/126.6 |
| 2012/0278995 A1* | 11/2012 | Kaplan | A47D 15/008 |
| | | | 5/663 |
| 2013/0198978 A1* | 8/2013 | Pohlman | E01D 1/00 |
| | | | 29/428 |
| 2016/0050882 A1* | 2/2016 | Longo | A01K 29/00 |
| | | | 119/849 |
| 2020/0037582 A1 | 2/2020 | Caterson et al. | |

* cited by examiner

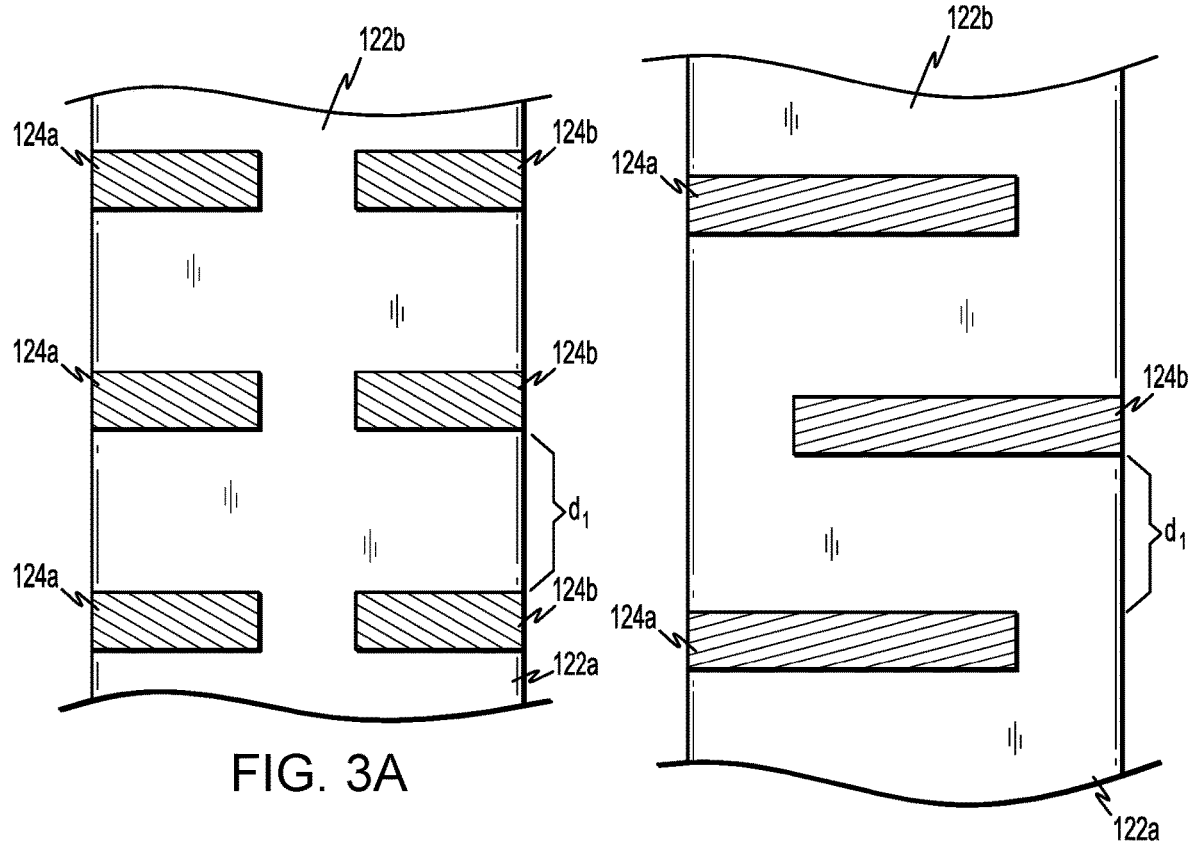
FIG. 3A
FIG. 3B
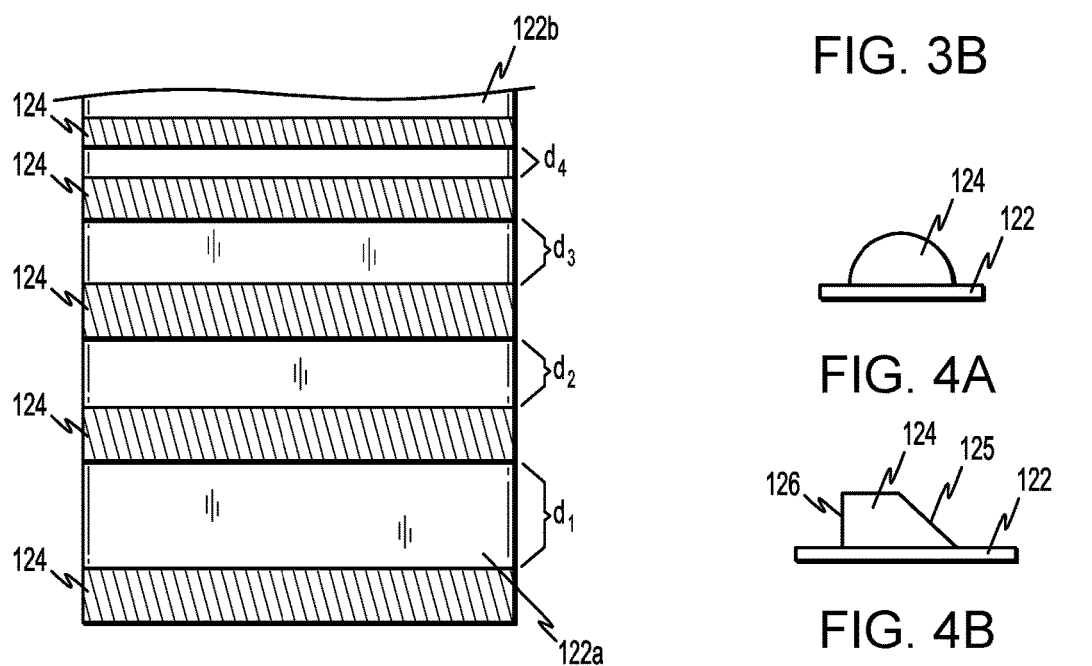
FIG. 3C
FIG. 4A
FIG. 4B

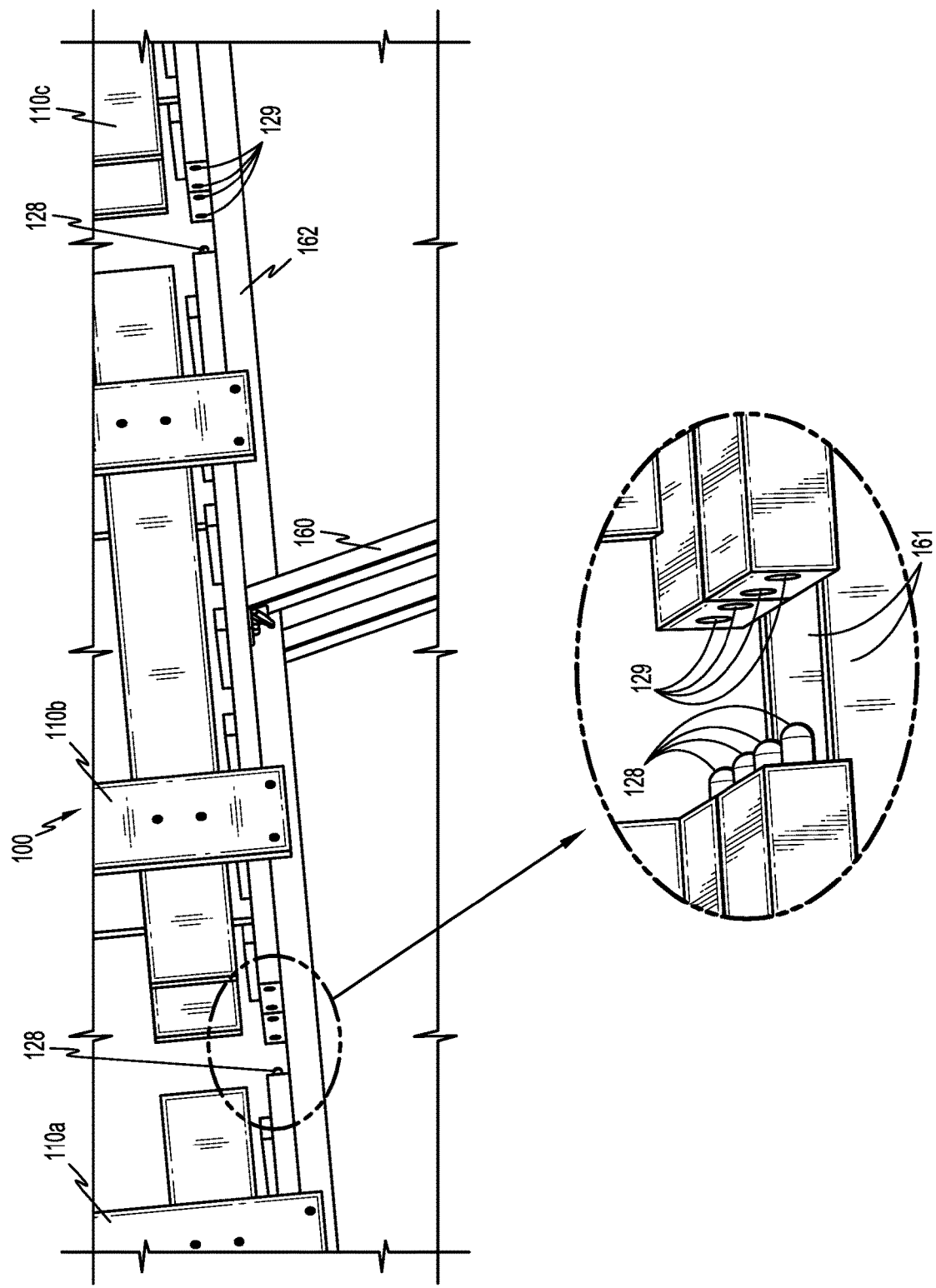

RAMP FOR PETS TO TRAVERSE OBSTACLES

CROSS-REFERENCE TO RELATED APPLICATION

This application claims the benefit of and priority to U.S. Provisional Patent Application No. 63/244,046, filed on Sep. 14, 2021, the entire disclosure of which is incorporated by reference herein.

TECHNICAL FIELD

The present disclosure relates generally to a ramp for a pet to traverse various obstacles.

BACKGROUND

Currently, there are a number of solutions for a pet to traverse an obstacle. Some of these solutions attempt to use a ramp-like concept, but these solutions fail to meet the needs of the industry for a variety of reasons. For example, some of the ramp-like concepts define a fixed length which can be difficult to accommodate a multitude of uses both indoor and outdoor. In addition, some of the ramp-like concepts of a fixed length may require the concept to be fixed at a steep angle of at least 25 degrees or greater which can be problematic for an infirmed or weak pet to climb. As the angle increases, existing ramp-like concepts exclude older or infirmed animals who are physically unable to use a ramp at a significant angle.

Also, none of the ramp-like concepts further include a rail system designed to guide and/or protect the pet as it crosses a ramp but also allows the pet to see beyond the rail which can help limit the likelihood of confusion or disorientation as the pet gets deeper across the ramp.

For at least these reasons, as well as at least some others, there is a need for an improved pet ramp, particularly for pets suffering from a health- or aged-related condition.

SUMMARY

The present disclosure describes a pet ramp specifically designed to aide pets suffering from a health- or aged-related condition. The pet ramp includes at least a ramp base assembly, one or more rail assemblies, and a support assembly.

In some embodiments, a ramp base assembly may include a base floor and a plurality of base cleats, the base floor defining a first length along a longitudinal axis between a proximal and distal end portion thereof and a first width extending transverse to the first length between a first and second outer edge. The plurality of base cleats positioned on a top side of the base floor. The base cleats extending transverse to the longitudinal axis and spaced along the length of the base floor.

In some embodiments, the first length of base floor (or ramp base assembly) may be determined by the height of the obstacle. For example, as the height of the obstacle increases, the first length may also increase in order to maintain the ramp at an appropriately low angle as described in more detail hereinbelow.

In some embodiments, the width of the base floor (or ramp base assembly) may be determined by the size or weight of the animal. For example, as the size or weight of the animal increases, the first width may also increase to properly accommodate the animal on the ramp.

In some embodiments, the one or more rail assemblies may include a first and second rail assembly located on opposite outer edges of the ramp base assembly. A first rail assembly may include a plurality of first vertical posts, a first upper rail, and a first lower guard panel. The plurality of first vertical posts may be spaced along the length of the floor on the first outer edge. The first upper rail extends between upper portions of the plurality of first vertical posts defining a first space between the base floor and the first upper rail. The first lower guard panel extends between lower portions of the plurality of first vertical posts at a height sufficient to prevent a leg of the pet from passing through the first rail assembly when stepping across the ramp.

A second rail assembly may include a plurality of second vertical posts, a second upper rail, and a second lower guard panel. The plurality of second vertical posts may be spaced along the length of the base floor on the second outer edge. The second upper rail extending between upper portions of the plurality of second vertical posts defining a second space between the base floor and the second upper rail. The second lower guard panel extending between lower portions of the plurality of second vertical posts at a height sufficient to prevent a leg of the pet from passing through the second rail assembly when stepping across the ramp.

A support assembly may be centered longitudinally on an underside the ramp base assembly including one or more support joists and a support post.

In some embodiments, the base floor may include one or more planks.

In some embodiments, the base cleats may extend generally perpendicular to longitudinal axis of base floor.

In some embodiments, the base cleats are generally rectangular.

In some embodiments, the base cleats include a proximal edge which is slanted relative to the base flooring and a distal edge which is perpendicular to the base flooring.

In some embodiments, the first and second upper rails are positioned on an outer edge of the first and second upper portions of the first and second vertical posts, respectively. This rail provides visual and tactile guidance while the animal is using the ramp.

In some embodiments, at least one of the first or second upper rails further includes a plurality of longitudinally spaced rail cleats.

In some embodiments, at least one of the first or second lower panel guards further includes a panel guard cleat extending longitudinally along a length of the lower panel guard.

In some embodiments, the plurality of support joists extend longitudinally along an underside of the ramp base assembly, wherein some part of each joist overlaps a second part of a neighboring abutted joist and each joist is positioned distally relative to a neighboring abutted joist.

In some embodiments, the support post is a single centered support post positioned at an acute angle relative to the ramp base assembly.

In some embodiments, the support post is an adjustable support post including an outer post including a central channel and an inner post configured to slide within the central channel of the outer post. The outer post may further include a threaded hole located inside the central channel and the inner post further includes a slot defined therethrough and a locking member positioned therein, the locking member configured to be screwed into the threaded hole to lock the inner post to the outer post.

BRIEF DESCRIPTION OF THE DRAWINGS

Various embodiments of the ramps and/or components of the ramps are described herein with reference to the drawings wherein:

FIG. 3A-3C are each a top view of a ramp assembly as described in at least one embodiment herein;

FIG. 4A-4B are each a side cross-sectional view a base cleat as described in at least one embodiment herein;

FIG. 12 is a perspective view of a plurality of modular ramp sections prior to being combined as described in at least one embodiment herein.

DETAILED DESCRIPTION

Figure 1B:
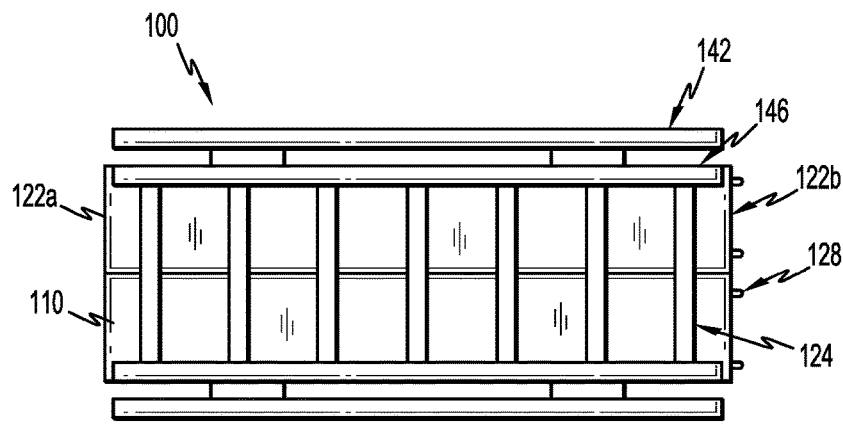
FIG. 1B is a top view of the modular section of the pet ramp of FIG. 1A as described in at least one embodiment herein.

The present is directed to a device or ramp (hereinafter ramp) designed to allow a pet to traverse an obstacle. Some non-limiting examples of such obstacles may include steps (e.g., indoor staircases, outdoor staircases, etc.), motor vehicles (e.g., seat of a car, rear bed of an SUV or pickup, cab of semi-truck, etc.), or furniture (e.g., bed, couch, chair, etc.). The one or more pets designed to utilize the ramp described herein may include any animal or domesticated animal, including but not intended to be limited to, a dog, cat, pig, pony, horse, tiger, and the like. The animal may be healthy or suffering from a health- or age-related condition, such as glycongenosis, hip dysplasia, muscular atrophy, muscular dystrophy, osteochondrosis, osteochondritis, seizures, dementia, arthritis, dizziness, loss of balance, paralysis, a physical disability, limited or loss of vision, and/or old-age. In some embodiments, the ramp may be configured particularly for use by a dog, or particularly a dog suffering from a health- or age-related condition.

As shown in FIGS. 1A-1D, the pet ramps 100 described herein may generally include one or more ramp sections 110. In some embodiments, the ramp sections 110 may be designed to be modular. Each ramp section 110 may include at least a ramp base assembly 120 and one or more rail assemblies 140.

Figure 2:
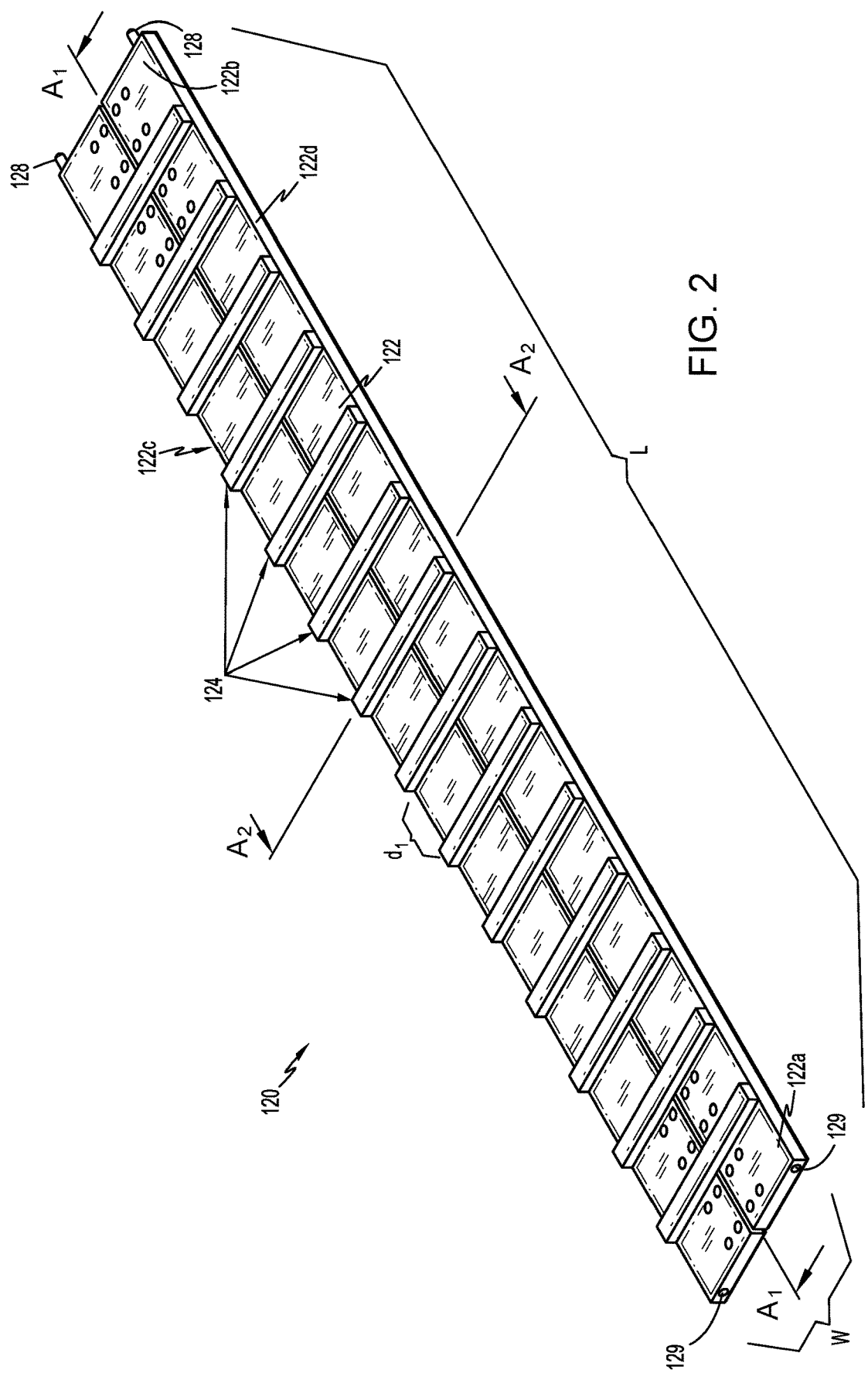
FIG. 2 is a perspective view of a ramp assembly as described in at least one embodiment herein.

For clarity purposes, a ramp base assembly 120 is shown separately from the pet ramp in FIG. 2. The ramp assembly 120 may include a base floor 122 and a plurality base cleats 124. The ramp assembly 120, base floor 122 and base cleats 124 may be formed as a one-piece structure or formed from a plurality of pieces. Some suitable non-limiting materials for forming the ramp base assembly, base floor, and base cleats include wood, decking materials, metals, polymeric materials, and the like.

As shown in FIG. 2, the base floor 122 defines a first length L along a first longitudinal axis $A_1$ between a proximal end portion 122a and a distal end portion 122b. The base floor 122 also defines a first width W along a transverse axis $A_2$, which is transverse to the first length (or first longitudinal axis $A_1$), between a first and second outer edge 122c, 122d. In some embodiments, the base floor 122 includes one or more planks 123. In some embodiments, the base floor is two or three planks 123 wide.

The ramp base assembly 120 (or the ramp sections 110) may be modular in design and may include one or more alignment pins 128 extending from the distal end portion 122b of the base floor 122 and one or more alignment holes 129 defined within a proximal end portion 122a of the base floor 122. As provided in more detail hereinbelow, the one or more distal alignment pins 128 of a first base assembly 120 (or section 110) are intended or configured to be received or maintained in the proximal one or more alignment holes 129 defined within a distally positioned second base assembly 120 (or second section 110).

As further shown in FIG. 2, the base assembly 120 also includes a plurality of base cleats 124. The base cleats 124 may be positioned on or fastened to a top side of the base floor 122 and extend across at least a portion the first width W of the base floor 122 generally perpendicular to first length L (and/or first longitudinal axis $A_1$). The base cleats 124 are spaced apart longitudinally from one another by a distance $d_1$ along the first length L of base floor 122. The base cleats 124 may allow the pet's foot/paw to push off therefrom when going up the ramp 100 and may also stop the pet from sliding when going down.

In some embodiments, as further shown in FIG. 2, the distance $d_1$ separating the base cleats 124 may remain generally constant or equal across the length L of the base floor 122 and may extend completely across the entire first width W. The distance $d_1$ between the neighboring base cleats 124 may be designed at intervals dependent upon a pet's gait or stride.

As shown in FIG. 3A, in some embodiments, the base cleats 124a, 124b may not extend completely across the width W of the base floor 122, and more particularly may extend across less than or equal to half the width W of the base floor 122. In such embodiments, a ramp assembly 120 may include a first set of base cleats 124a and second set of base cleats 124b wherein the first set of base cleats 124a extend from the first outer edge 122c of the floor 122 across less than about half the width W of the floor 122 and the second set of base cleats 124b extend from the second outer edge 122d of the floor 122 across less than about half the width W of the floor 122.

As shown in FIG. 3B, in some embodiments, the base cleats 124a, 124b may not extend completely across the width W of the base floor 122, and more particularly may extend across greater than or equal to half the width W of the base floor 122. In such embodiments, a ramp assembly 120 may include a first set of base cleats 124a and second set of base cleats 124b wherein the first set of base cleats 124a extend from the first outer edge 122c of the floor 122 across greater than about half the width W of the floor 122 and the second set of base cleats 124b extend from the second outer edge 122d of the floor 122 across greater than about half the width W of the floor 122. As further depicted in FIG. 3B, in some embodiments, the first and second sets of base cleats 124a, 124b may staggered along the length L of the floor 122 (as opposed to being aligned as shown in FIG. 3A).

As shown in FIG. 3C, in some embodiments, the base cleats 124, 124a, 124b may not be spaced generally equally apart from each other along the length L of the floor 122. For example, in some embodiments, the distances $d_1$-$d_4$ between neighboring base cleats 124 may decrease as the base cleats 124 proceed distally along the length of the floor 122. It is envisioned that as a pet traverses the ramp base assembly 120 in a distal direction, the pet may begin to shorten the pet's stride or gait due to at least one of the length of the ramp, the angle of the ramp, or the condition of the pet. Therefore, decreasing the distances (e.g., $d_1 > d_2 > d_3 > d_4$) between base cleats 124 in a distal direction may in some instances further assist the pet in crossing the ramp completely as the pet tires or becomes less focused on crossing.

The base cleats 124, 124a, 124b are depicted in FIGS. 1A, 2, 3A and 3B as generally square or rectangular in shape or cross-section. However, any one or more of the base cleats described herein may define any suitable shape or cross-section. For example, as depicted in FIG. 4A, in some embodiments, one or more of the base cleats 124 may define a generally round, e.g., circular, or elliptical, shape or cross-section. It is envisioned that rounded, radiused or chamfered cross-section will benefit animals who suffer from pain in their paws (tenderfoots) by not having a sharp edge for the paw to push against. In another example, as shown in FIG. 4B, one or more of the base cleats 124 may define a trapezoidal shape wherein the proximal side 125 of the base cleat 124 may include a slanted edge relative to the floor 122 while the distal side 126 of the base cleat 124 is generally perpendicular edge to the floor 122. It is envisioned that the slanted proximal side of the base cleat (as opposed to a perpendicular proximal side) may assist pets utilizing a pet wheelchair to easily traverse the base cleats by allowing the wheels to simply roll up the slanted proximal side and over the cleat (as opposed to the wheels being potentially exposed to some level of resistance by a perpendicular proximal side of the base cleat). It is further envisioned that the perpendicular distal side of the base cleat may provide the pet with an edge to push off of while crossing the ramp and also may potentially provide sufficient resistance to the wheels when distal the base cleat from rolling proximally back down the ramp floor.

Figure 5:
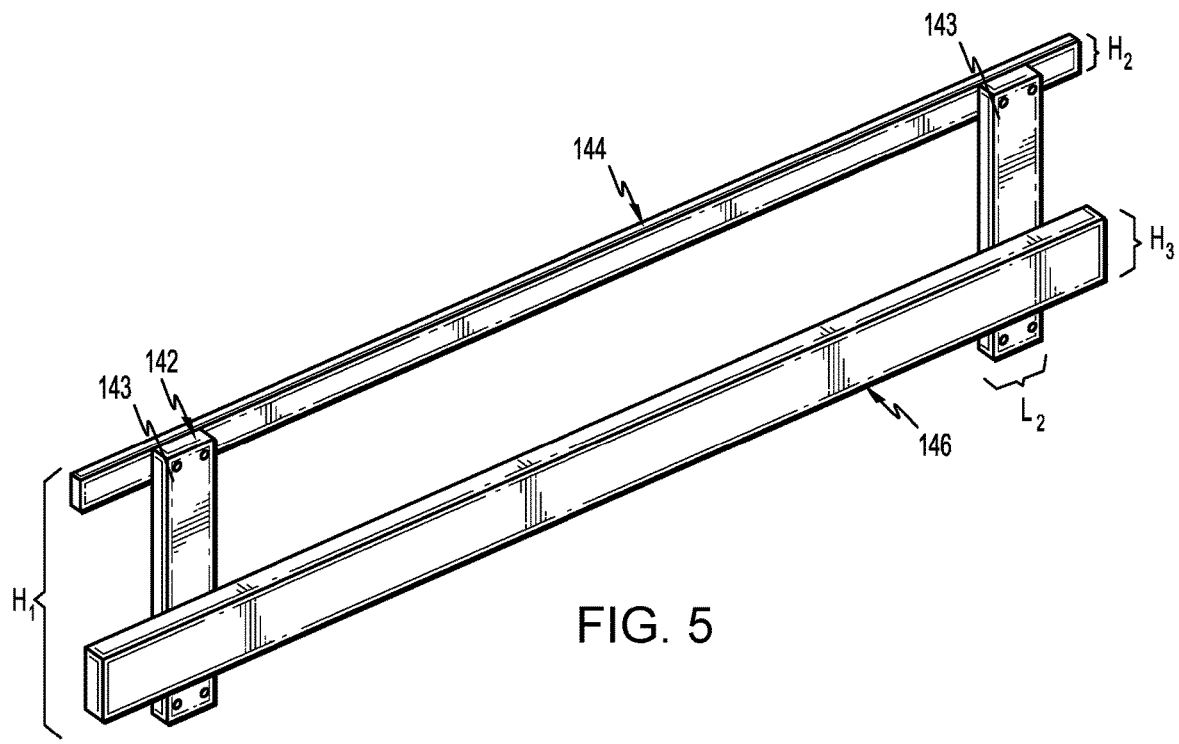
FIG. 5 is a perspective view of a rail assembly as described in at least one embodiment herein.

As shown generally in FIGS. 1A-1D, the pet ramps 100 (or ramp sections 110) described herein include at least one, if not two, rail assembly 140. The rail assembly is designed to promote or define a stable width base for the animal to keep while traversing the ramp. Some suitable non-limiting materials for forming the rail assembly (e.g., the vertical post, upper rail, lower guard, and any cleats on the rail assembly) include wood, decking materials, metals, polymeric materials, and the like. FIG. 5 isolates a rail assembly 140 from the ramp for clarity purposes.

Each rail assembly 140 includes at least a plurality of vertical posts 142, an upper rail 144, and a lower guard panel 146. The vertical posts 142 of each rail assembly 140 are spaced along the length L of the ramp base assembly 120 (or base floor 122), and particularly, on or adjacent to the same outer edge (122c or 122d) of the base assembly 120 (or base floor 122). The vertical posts 142 defining a height H, generally perpendicular to both the length L and width W of ramp base assembly 120 (or base floor 122). The post height $H_1$ may be designed to generally reach a shoulder height of the pet while crossing the ramp 100. The vertical posts 142 may define a post length $L_2$ which is greater than an upper rail height $H_2$ of the upper rail 144 to provide sufficient support thereto.

The upper rail 144 extends between upper portions 143 of at least two neighboring vertical posts 142. A space S is defined between the upper rail 144 and the base floor 122. In some embodiments, the upper rail 144 may be positioned on an outer surface of neighboring vertical posts 142 and provides visual guidance to the animal while crossing the ramp. However, in some other embodiments, the upper rail may be positioned on an inner surface of neighboring vertical posts 142 which may further provide upper tactile guidance to the animal while crossing the ramp.

The lower guard panel 146 extends between lower portions 145 of at least two neighboring vertical posts 142 and may be positioned on an inner surface thereof. The vertical posts 142 may define a post length $L_2$ which is generally equal to a lower panel height $H_3$ of the lower guard panel 146 to provide sufficient support thereto.

The lower panel height $H_3$ defined by the lower guard panel 146 may be sufficient to cover from ⅛ to ⅔ of the space S defined between the upper rail 144 and the base floor 122. The lower panel height $H_3$ is designed to be sufficient to prevent a leg of the pet from stepping, naturally or accidently due to a condition, through the rail assembly when crossing the ramp. In some embodiments, the lower panel height $H_3$ covers from ¼ to ½ of the space S. In some embodiments, the lower panel height $H_3$ covers about ½ of the space S.

Figure 1A:
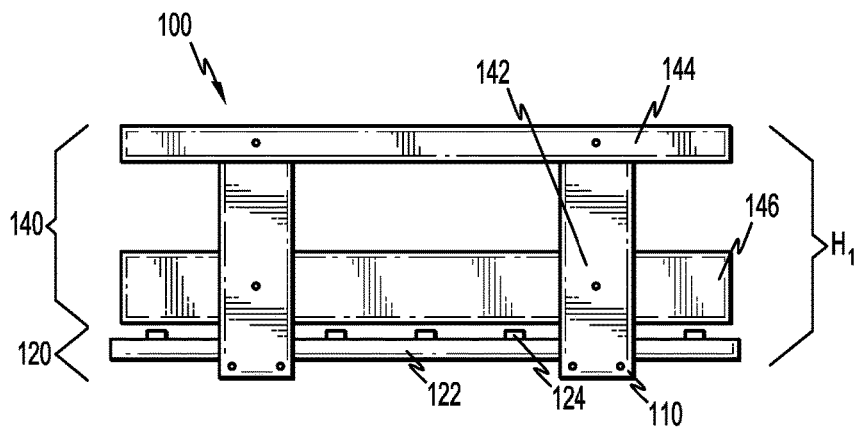
FIG. 1A is a side view of a modular section of a pet ramp as described in at least one embodiment herein.
Figure 1C:
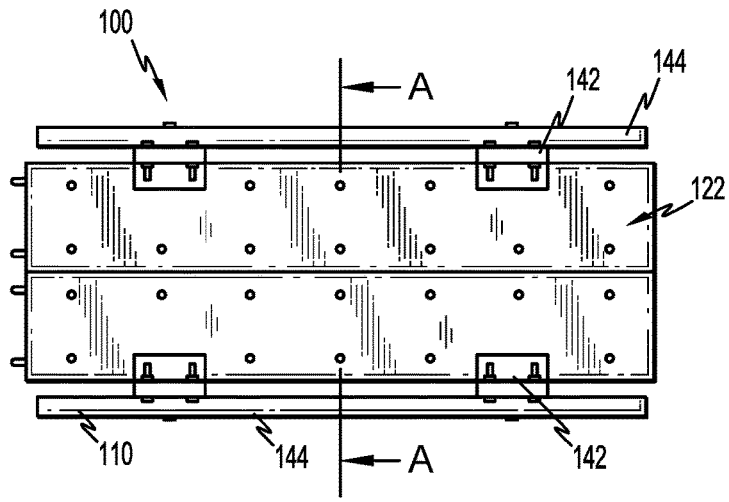
FIG. 1C is a bottom view of the modular section of the pet ramp of FIG. 1A as described in at least one embodiment herein.
Figure 1D:
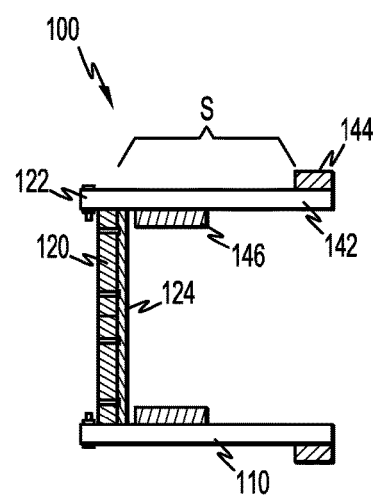
FIG. 1D is a cross-sectional view of the modular section of the pet ramp of FIG. 1A as described in at least one embodiment herein.

As further shown in FIGS. 1A and 1D, in some embodiments, the lower guard panel 146 may be positioned on the lower portion of the vertical posts while remaining above a top of the base cleats 124. In this configuration, the length of the pet's gait or stride, as well as the placement of the pet's feet or paws, is observable to an observer (e.g., pet owner or veterinarian) from outside the ramp.

Figure 6A:
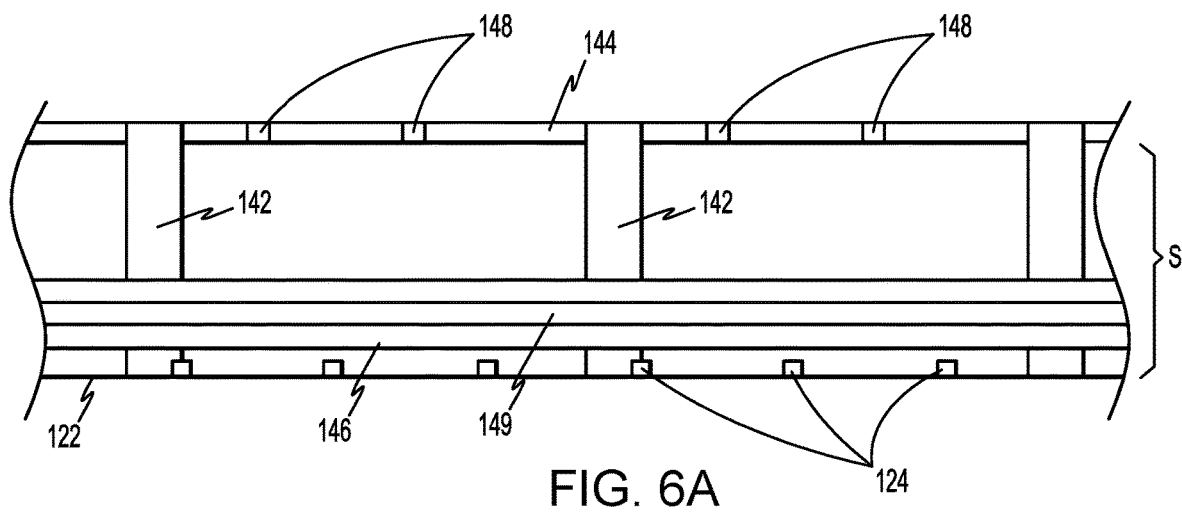
FIG. 6A is a perspective view of a rail assembly as described in at least one embodiment herein.
Figure 6B:
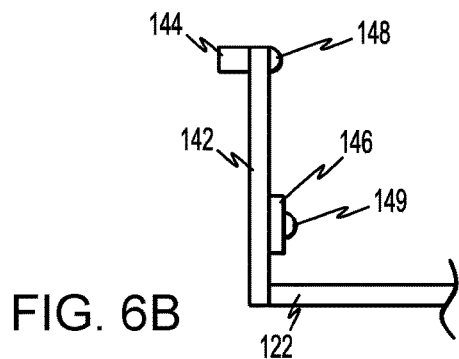
FIG. 6B is a cross-sectional view of the rail assembly of FIG. 6A as described in at least one embodiment herein.

Turning to FIGS. 6A and 6B, in some embodiments, the one, if not two, rail assembly 140 may further include one or more rail cleats 148, a guard panel cleat 149, or both. The rail cleats 148 being positioned on or fastened to an inner surface of the upper rail 144 and spaced apart from each other longitudinally along a length of the upper rail 144. The single guard panel cleat 149 extending along at least a portion, if not all, of the length of the guard panel 146. Each of the rail cleats 148 and the guard panel cleats 149 may have a shape or cross-section which is blunt or round (e.g., circular, elliptical).

In some embodiments, the pet ramps described herein may further include one or more lights, and particularly LEDs. The lights or LEDs may be combined with or made part of any suitable part of the pet ramp. In particularly useful embodiments, the lights or LEDs may be combined or a part of one or more of the base cleats 124, the rail cleats 148, or the guard panel cleat 149. The lights or LEDs may be powered using any suitable manner including, but not limited to, AC, DC, batteries, or solar power.

Figure 7A:
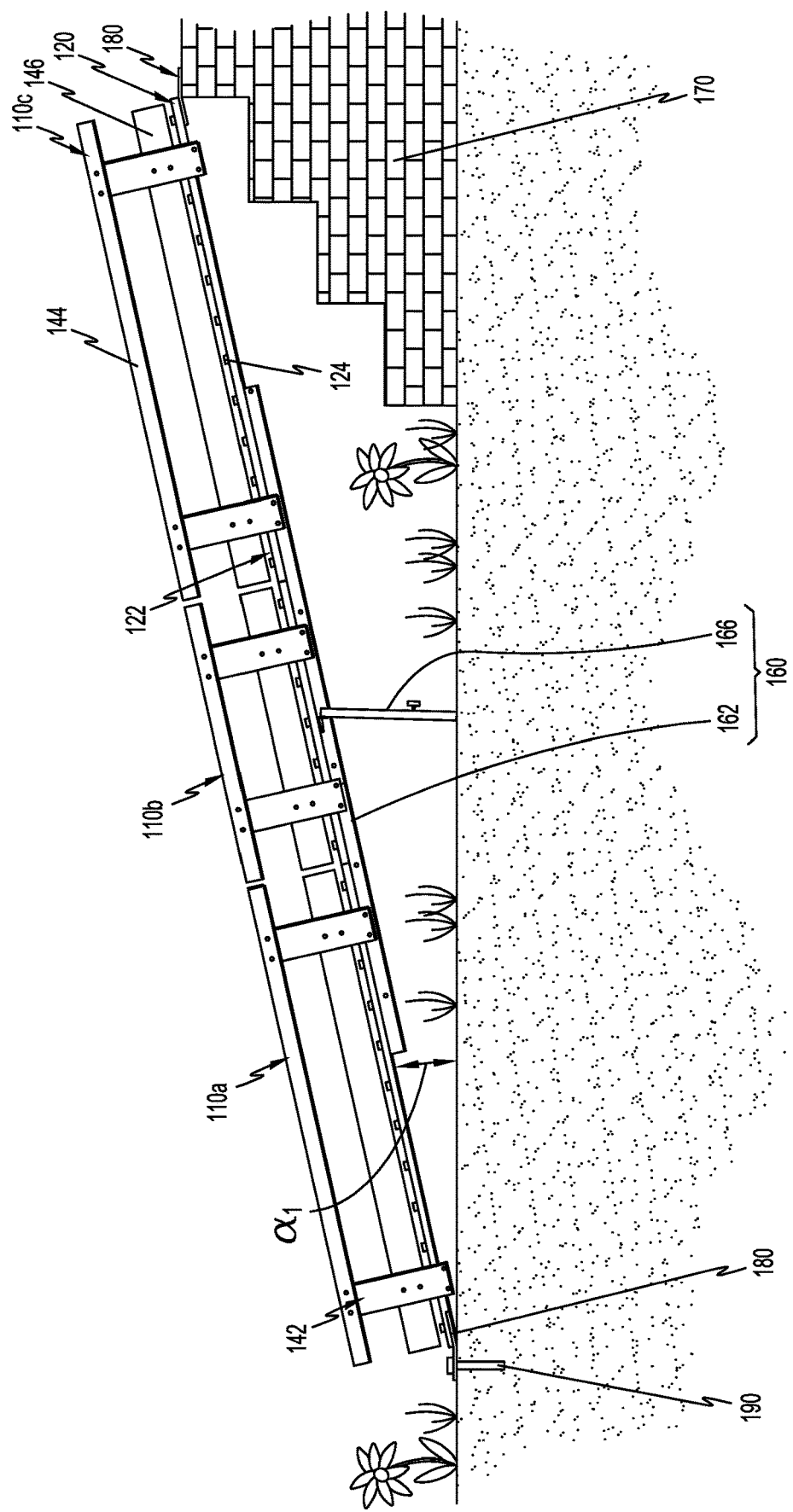
FIG. 7A is a side view of a pet ramp as described in at least one embodiment herein.
Figure 7B:
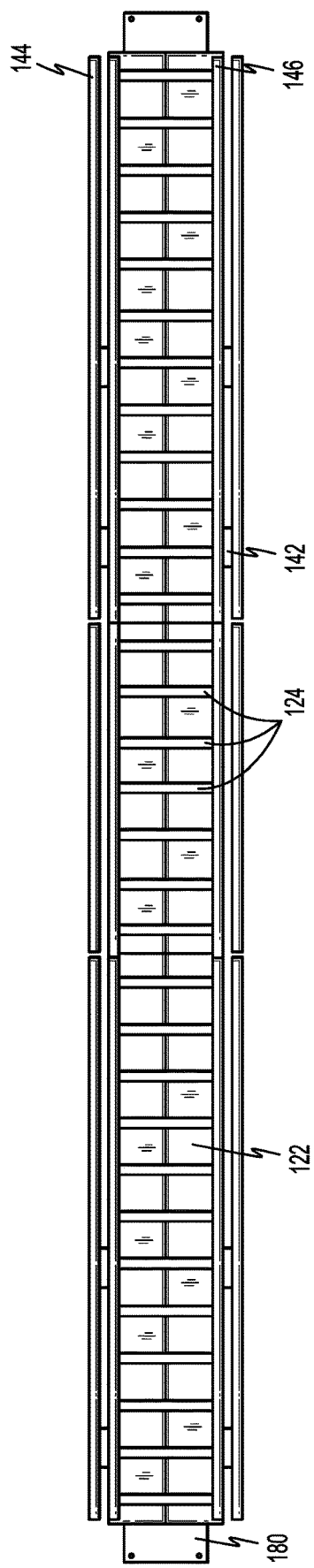
FIG. 7B is a top view of the pet ramp of FIG. 7A as described in at least one embodiment herein.
Figure 7C:
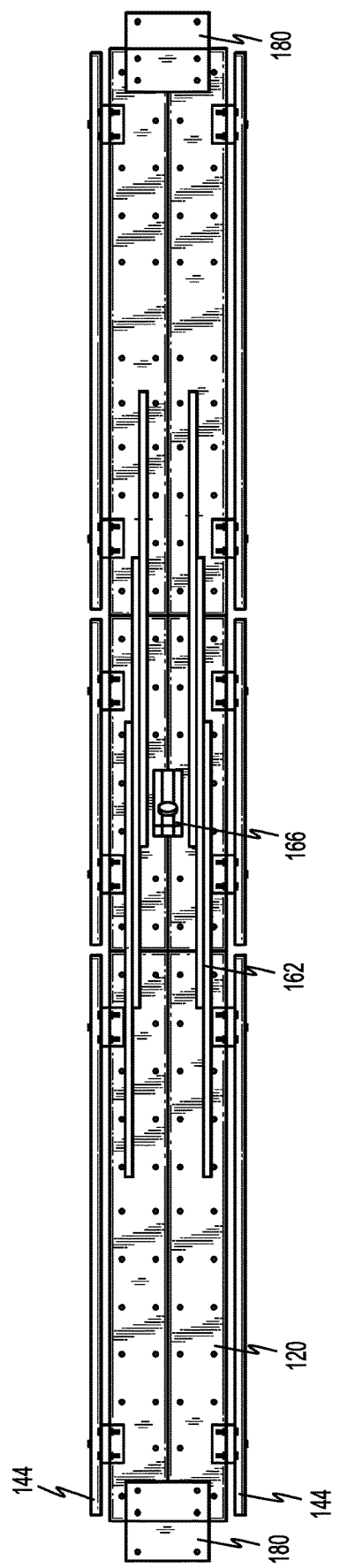
FIG. 7C is a bottom view of the pet ramp of FIG. 7A as described in at least one embodiment herein.

FIGS. 7A-7C depict a pet ramp 100 described herein positioned next to an obstacle 170, such as a set of stairs or steps of a stoop. A plurality of ramp sections 110a-100c are depicted assembled on top of a support assembly 160 to form the pet ramp 100. In some embodiments, the ramp sections 100a-100c may each define a different length. Although depicted as modular in FIGS. 7A-7C, the pet ramps 100 described herein may alternatively be formed from only one ramp section 110 of sufficient length.

As further depicted in FIG. 7A, the pet ramps 100 describe herein are configured to define an angle $a_1$ between the ramp section 110 (110a, 110b, 110c) and the ground upon which the ramp 100 sits when connected to the obstacle 170. The angle $a_1$ may be range up to about 15 degrees. In some embodiments, the angle $a_1$ may be range from 5-17 degrees. In some embodiments, the angle $a_1$ may be range from 10-15 degrees. In some embodiments, the angle $a_1$ may be 15 degrees.

As further depicted in FIG. 7A, the proximal and distal ends of the ramp 100 may be secured to the ground and the obstacle 170 by end mounting brackets 180. The end mounting brackets 180 are designed to affix the ends of the ramp into a non-movable position. Spikes or any other suitable ramp fastener (e.g., glues, adhesives, pins, screws, nails, rope, bungee cords, etc.) 190 may be used to anchor the ramp on both end to prevent slip, shifting, or movement, particularly when a pet is crossing the ramp. A bracket plate may be positioned over each bracket/fastener combination to protect the ramp from marring, scratching and the like.

Figure 8:
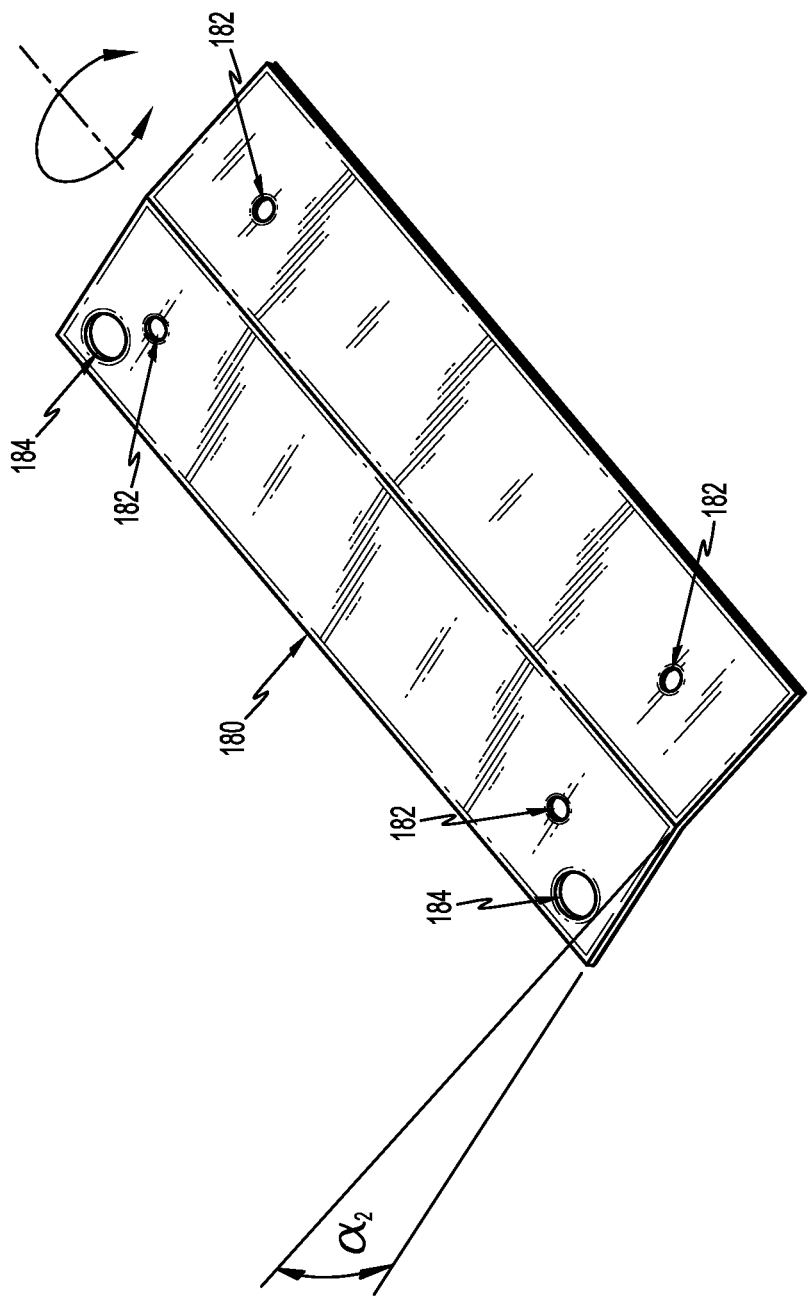
FIG. 8 is a perspective view of a mounting bracket as described herein in at least one embodiment.

As shown in more detail in FIG. 8, the end mounting bracket 180 may define a bracket angle $a_2$ designed to mirror the ramp angle $a_1$ so when the bracket is attached to the end of the ramps 100, half the bracket is level with the ground or stair upon which the end of the ramp is secured to. In some embodiments, the end mounting brackets includes a plurality, such as four of bracket holes 182 configured to allow suitable bracket fasteners (e.g., nails, screws, pins, bolt, and the like) to pass therethrough to secure the bracket to the ramp. In some embodiments, the end mounting brackets may also include one or more fastener holes 184 for passing the ramp fastener therethrough when appropriate.

As further shown in FIGS. 7A and 7C, the pet ramp 100 may include a support assembly 160 including a plurality of support joists 162 and at least one support post 166. The support post 166 may be a post defining a single post height or the support post 166 may be an adjustable post designed to define a variety of adjustable post heights. The support assembly 160 is designed to support the one or more ramp sections 110 (110a-c), with or without a pet positioned thereon. In addition, the support assembly 160 is designed to reduce or eliminate bounce of the ramp 100 while a pet crosses the ramp 100 to traverse the obstacle 170. The support assembly 160 may be centered on the bottom side of the pet ramp 100. Some suitable non-limiting materials for forming the ramp support assembly (e.g., support joist, support post) include wood, decking materials, metals, polymeric materials, and the like.

Figure 9:
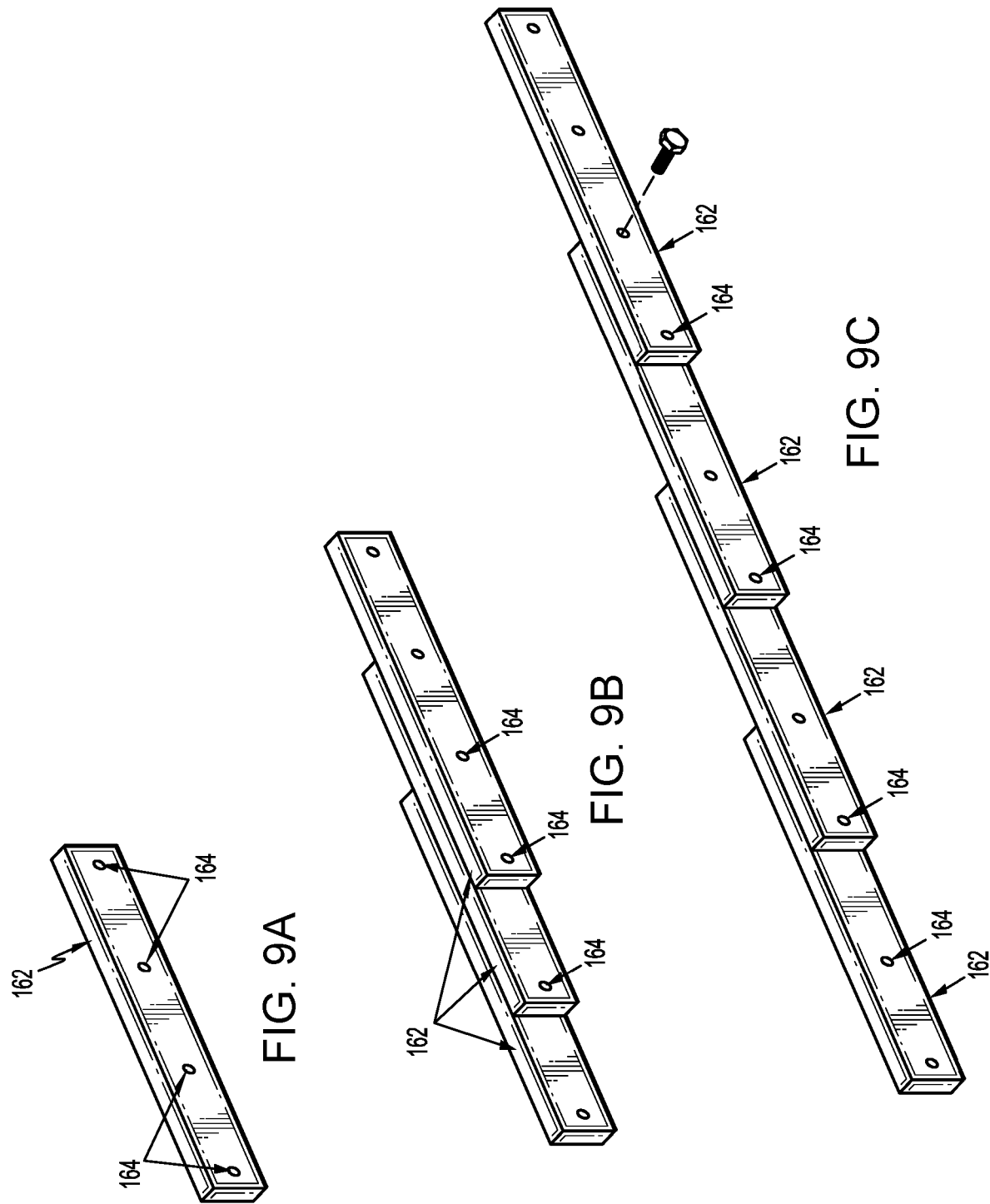
FIGS. 9A-9C are each a side perspective view of one or more support joists, alone or in combination to form at least a portion of a joist system as described herein in at least one embodiment.

In some embodiments, as shown in FIG. 7C, the support joists 162 extend longitudinally along a length of the bottom side of the ramp 100 (or ramp section(s) 110). The plurality of support joists when anchored to the bottom side of the pet ramp 100 with deck screws, glue, etc., unites the plurality of ramp sections 110 into a single Pet Ramp 100. As shown in more detail in FIGS. 9A-9C, each support joist 162 may include a plurality of joist holes 164 equidistant from each allowing for multiple support joists 162 to be linked together in a partially abutting manner by placing bolts or other fasteners through overlapping joist holes 164 of abutted joists 162 to bind them together. It is recognized that a plurality of joints supports may be abutted and join together by other means besides bolts. Glue, ropes, wire, clamps etc. could be used, Because the joist holes 164 are equidistant apart on each of the joists 162, the joist system 161 can be adjusted to be stiffer (FIG. 9B) or less stiff (FIG. 9C) by increasing or decreasing, respectively, the number of overlapping joist holes 164 of abutted joists 162 while maintaining the length of the support assembly 160 by adding or removing, respectively, additional joists 162 to the assembly 160.

In some embodiments, the joist system 161 may extend along about ½ to ¾ the length of the pet ramp 100. In some embodiments, the joists 162 of the joist system 161 may telescope inwardly in a distal direction (FIG. 7C).

Figure 10:
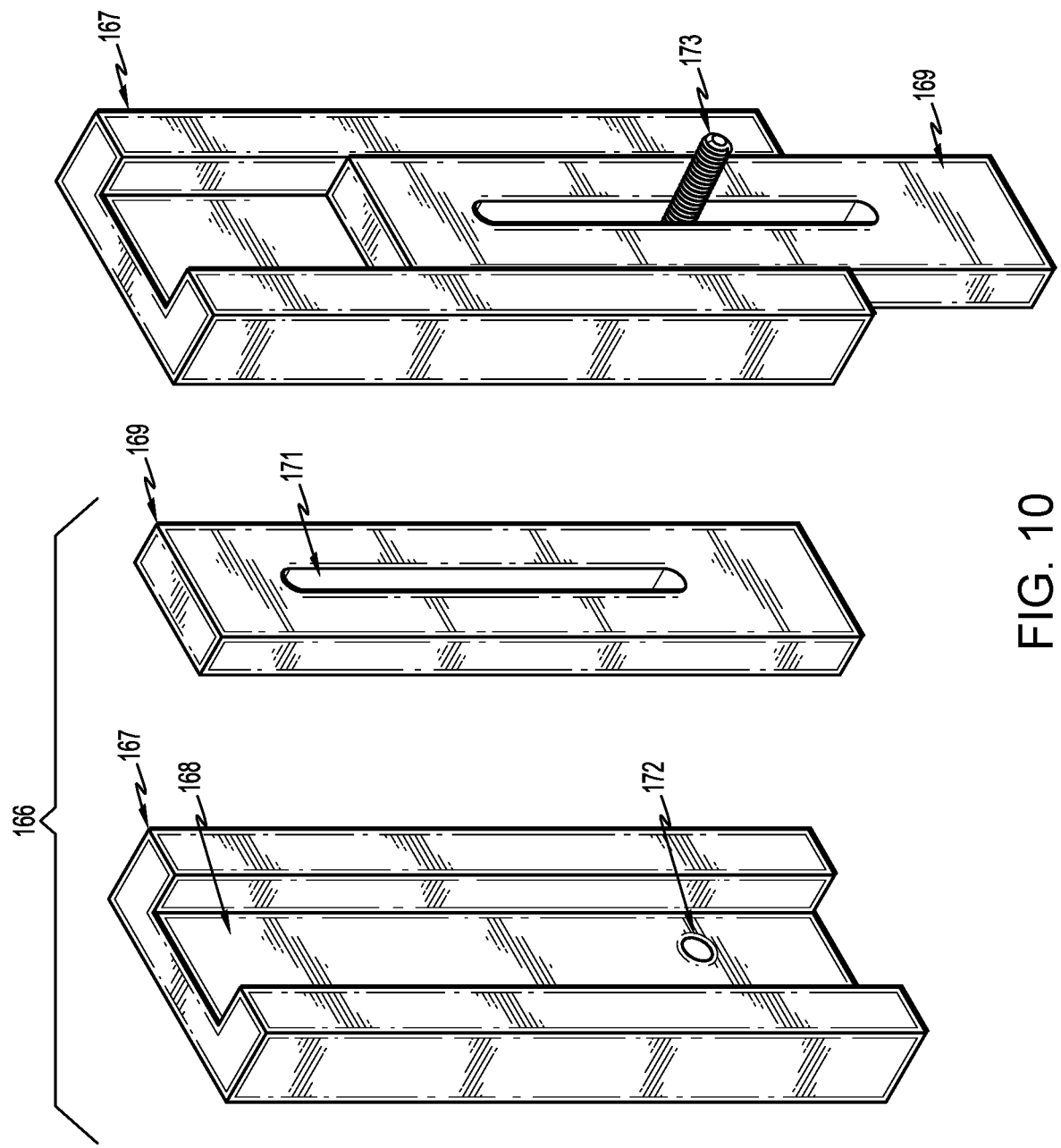
FIG. 10 is a perspective view of a support post as described in at least one embodiment herein.

FIG. 10 depicts an adjustable support post 166 including an outer post 167 including a channel 168 defined therein and an inner post 169 including a slot 171 defined therethrough. The inner post 169 designed to slide along the outer post 167 within channel 168 to adjust the overall height of the support post 166. The outer post 167 may further include a threaded hole 172 located within the channel 168 and the inner post 169 may further include a locking member 173, such as a threaded knob, positioned within the slot 171. The locking member 173 designed to be screwed into the threaded hole 172 of the outer post 167 to lock the inner post 169 to the outer post 167, thereby locking the overall height of the support post 166.

In some embodiments, at least the top of the support posts described herein may be angled in a manner similar to the angle $a_1$ of the ramp. For example, the top of the support post and the angle $a_1$ of the ramp may both be 15 or less degrees.

Figure 11:
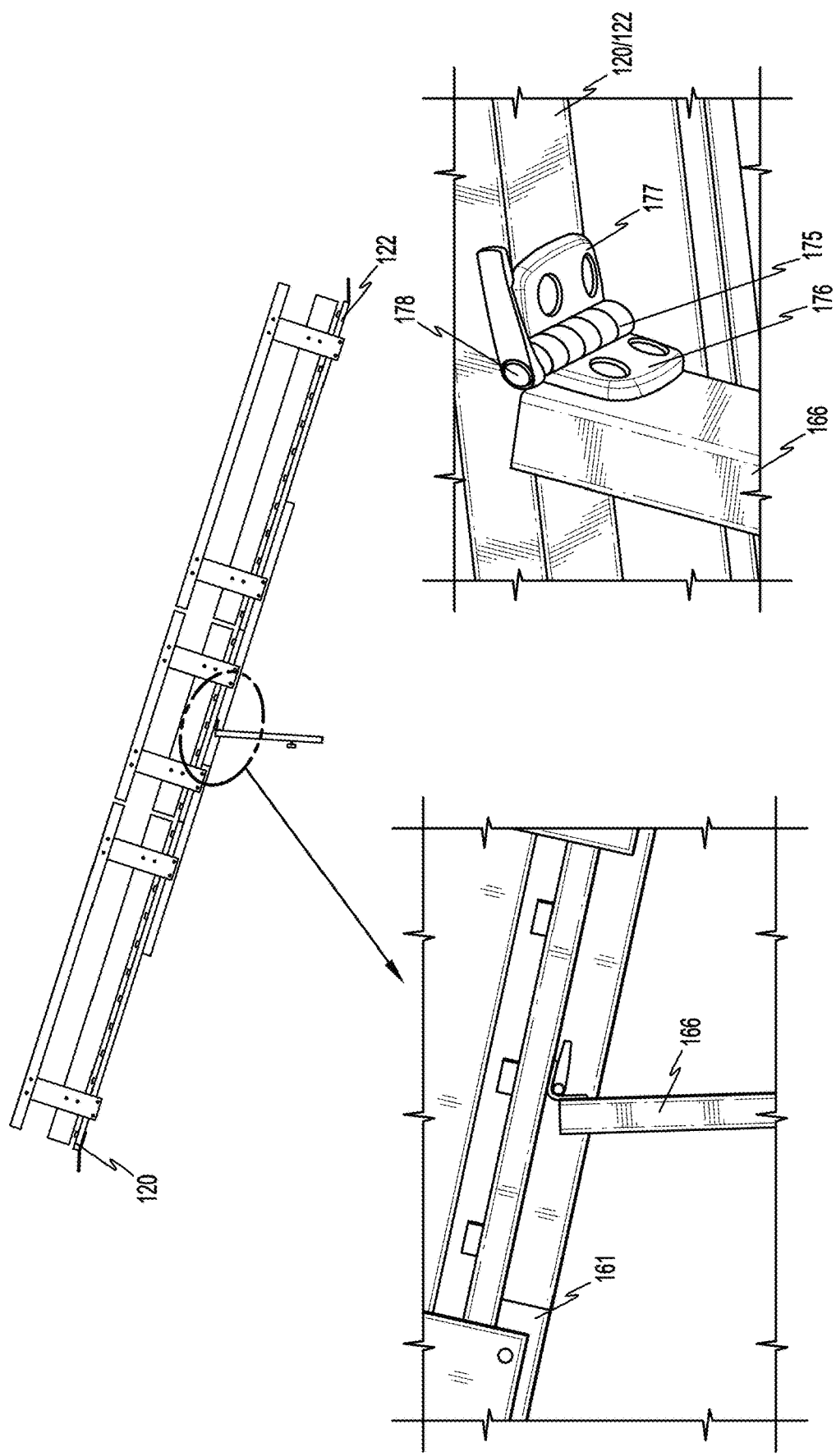
FIG. 11 is a side view of a support post and support joists as described in at least one embodiment herein.

FIG. 11 depicts the support post 166 attached to the support joist system 161 (or ramp assembly 120 or base floor 122) via a hinge 175, such as a tightening hinge, to allow support the pet ramp centrally. In some embodiments, the hinge 175 may include a first part 176 positioned on or attached to the support post 166 and a second part 177 positioned on or attached to the underside of the ramp base assembly 120 (or base floor 122). The hinge 175 may include a hinge bolt 178 with a handle that allows it to be turned. When turned, the hinge bolt 178 clamps down on both parts of the hinge 175, locking the parts into place.

In some embodiments, the support post 166 may support the ramp 100 at an acute angle.

In some embodiments, as shown in FIG. 12, one or more modular ramp sections can be combined on top of the support assembly 160. In some embodiments, a first modular ramp section 110 (110b) may be centered and secured on top is of the support assembly 160, and particularly the joist system 161 of the support assembly 160. Thereafter, the alignment pins 128 and/or the alignment holes 129 of one or more additional modular ramp sections 110 (110a, 110c) may aligned with the alignment holes 128 and/or alignment holes 129, respectively, of the first modular ramp section 110 (110b) and then combined or slid with each other forcing the alignment members 128 to enter the alignment holes 129 aligning/mating the multiple modular ramp sections 110 (110a-c) to each other on top of the joists 162 to form a pet ramp 100 of a given length.

In some embodiments, the ramp described may include only one ramp section. In some other embodiments, the ramp described herein may include a plurality of ramp sections. In still other embodiments, the ramp described herein may include a plurality of modular ramp sections configured to matingly engage to each other to quickly form a ramp of greater length than a single modular ramp section thereby allowing the ramp to be variable in length as needed.

The pet ramps described herein may differ from other known ramp-like devices in one or more manners. For example, in some embodiments, the ramps described herein may be modular thereby providing for ramps of various lengths suitable for maintaining a ramp angle ($a_1$) sufficiently low for an animal of any health- or age-related condition to comfortable cross the ramp. In another example, the base cleats may allow the animal to push off when climbing up the ramp or lean thereon when coming down the ramp. In still another example, the rail assembly may prevent the animal from falling, stepping, or even jumping off the ramp while allowing the lines of sight of the animal from being completely or mostly blocked. The rail assembly may also provide an observer to monitor the animal's gait or stride from outside, and particularly from a side of, the ramp. In yet another example, the support post, the joists, or both, may prevent the ramp from bouncing as the animal crosses the ramp. Bounce can be very destabilizing for an animal suffering from a health- or age-related condition.

It will be understood that various modifications may be made to the embodiments disclosed herein. Thus, those skilled in the art will envision other modifications within the scope and spirit of the disclosure.

What is claimed is:

1. A pet ramp comprising:
a ramp assembly including a base floor and a plurality of base cleats, the base floor defining a first length along a longitudinal axis between a proximal and distal end portion thereof and a first width extending transverse to the first length between a first and second outer edge, the plurality of base cleats positioned on a top side of the base floor, the base cleats extending transverse to the longitudinal axis and spaced along the length of the base floor,
a first rail assembly including a plurality of first vertical posts, a first upper rail, and a first lower guard panel, the plurality of first vertical posts spaced along the length of the floor on the first outer edge, the first upper rail extending between upper portions of the plurality of first vertical posts defining a first space between the base floor and the first upper rail, and the first lower guard panel extending between lower portions of the plurality of first vertical posts at a height sufficient to prevent a leg of a pet from passing through the first rail assembly while also acting as a tactile guide for the leg of the pet when stepping across the ramp, wherein the first upper rail is positioned on an outer edge of the first vertical posts and the first lower guard panel is positioned on an inner surface of the first vertical posts, and
a second rail assembly including a plurality of second vertical posts, a second upper rail, and a second lower guard panel, the plurality of second vertical posts spaced along the length of the base floor on the second outer edge, the second upper rail extending between upper portions of the plurality of second vertical posts defining a second space between the base floor and the second upper rail, and the second lower guard panel extending between lower portions of the plurality of second vertical posts at a height sufficient to prevent a leg of the pet from passing through the second rail assembly while acting as a tactile guide for the leg of the pet when stepping across the ramp, wherein the second upper rail is positioned on an outer edge of the second vertical posts and the second lower guard panel is positioned on an inner surface of the second vertical posts,
wherein the plurality of first and second vertical posts define a post height configured to reach a shoulder height of the pet while crossing the ramp.

2. The pet ramp of claim 1, wherein the base floor includes one or more planks.

3. The pet ramp of claim 1, wherein the base cleats are perpendicular to longitudinal axis of base floor.

4. The pet ramp of claim 1, wherein the base cleats are generally rectangular.

5. The pet ramp of claim 1, wherein the base cleats are generally rounded or chamfered to soften the base for animals suffering from tender feet.

6. The pet ramp of claim 1, wherein the base cleats include a proximal edge which is slanted relative to the base flooring and a distal edge which is perpendicular to the base flooring.

7. The pet ramp of claim 1, wherein at least one of the first or second upper rails further includes a plurality of longitudinally spaced rail cleats.

8. The pet ramp of claim 7, wherein the rail cleats define a round cross-section.

9. The pet ramp of claim 1, wherein at least one of the first or second lower guard panels is spaced from the topside of the base floor.

10. The pet ramp of claim 1, wherein the first lower panel height of the first lower guard panel covers between ⅛ and ½ of the first space between the first upper rail and the base floor and the second lower panel height of the second lower guard panel covers between ½ and ½ of the second space between the second upper rail and the base floor.

11. The pet ramp of claim 1, wherein at least one of the first or second lower panel guards further includes a panel guard cleat extending longitudinally along a length of the lower panel guard.

12. The pet ramp of claim 1, further comprising a support assembly centered longitudinally on an underside of the ramp assembly including a plurality of support joists and a support post, wherein the plurality of support joists extend longitudinally along the underside of the ramp assembly, wherein some part of each support joist overlaps a second part of a neighboring abutted support joist and each support joist is positioned distally relative to a neighboring abutted support joist.

13. The pet ramp of claim 12, wherein the support post is a single centered support post positioned at an acute angle relative to the ramp base assembly.

14. The pet ramp of claim 13, wherein the support post to prevent bounce is an adjustable support post including an outer post including a central channel and an inner post configured to slide within the central channel of the outer post.

15. The pet ramp of claim 14, wherein the outer post further includes a threaded hole located inside the central channel and the inner post further includes a slot defined therethrough and a locking member positioned therein, the locking member configured to be screwed into the threaded hole to lock the inner post to the outer post.

16. A pet ramp comprising:
a ramp assembly including a base floor and a plurality of base cleats, the base floor defining a first length along a longitudinal axis between a proximal and distal end portion thereof and a first width extending transverse to the first length between a first and second outer edge, the plurality of base cleats positioned on a top side of the base floor, the base cleats extending transverse to the longitudinal axis and spaced along the length of the base floor, at least one rail assembly including a plurality of vertical posts, an upper rail, and a lower guard panel, the plurality of vertical posts spaced along the length of the first or second outer edge of the base floor, the upper rail extending between upper portions of the plurality of vertical posts defining a space between the base floor and the upper rail, and the lower guard panel extending between lower portions of the plurality of vertical posts at a height sufficient to prevent a leg of a pet from passing through the at least one rail assembly while acting as a tactile guide for the leg of the pet when stepping across the ramp, wherein the upper rail is positioned on an outer surface of the plurality of vertical posts and the lower guard panel is positioned on an inner surface of the plurality of vertical posts, and the plurality of vertical posts define a post length which is greater than an upper rail height of the upper rail.

17. The pet ramp of claim 16, further comprising a support assembly centered longitudinally on an underside the ramp assembly including one or more support joists and a support post.

18. The pet ramp of claim 16, wherein each vertical post defines a post height configured to reach a shoulder height of the pet while crossing the ramp.

19. The pet ramp of claim 16, wherein the post length of the vertical posts is equal to a lower panel height of the lower guard panel.

20. The pet ramp of claim 16, wherein the pet is a domesticated animal suffering from an age or health related condition.

* * * * *